US011661373B2

(12) United States Patent
Nakano et al.

(10) Patent No.: US 11,661,373 B2
(45) Date of Patent: May 30, 2023

(54) METHOD FOR RECYCLING SOLAR CELL MODULE GLASS

(71) Applicant: Tottori Resource Recycling Inc., Tottori (JP)

(72) Inventors: Shigenori Nakano, Tottori (JP); Hiroki Tanaka, Tottori (JP)

(73) Assignee: Tottori Resource Recycling Inc., Tottori (JP)

( * ) Notice: Subject to any disclaimer, the term of this patent is extended or adjusted under 35 U.S.C. 154(b) by 319 days.

(21) Appl. No.: 17/094,038

(22) Filed: Nov. 10, 2020

(65) Prior Publication Data

US 2021/0053868 A1 Feb. 25, 2021

Related U.S. Application Data

(62) Division of application No. 16/620,761, filed as application No. PCT/JP2018/035004 on Sep. 21, 2018, now Pat. No. 10,865,137.

(30) Foreign Application Priority Data

Sep. 27, 2017 (JP) ............................. JP2017-186944

(51) Int. Cl.
| | |
|---|---|
| *C03C 11/00* | (2006.01) |
| *B09B 3/00* | (2022.01) |
| *C03B 19/08* | (2006.01) |
| *C03C 1/00* | (2006.01) |

(52) U.S. Cl.
CPC .............. *C03C 11/007* (2013.01); *B09B 3/00* (2013.01); *C03B 19/08* (2013.01); *C03C 1/002* (2013.01)

(58) Field of Classification Search
CPC ........ C03C 11/007; C03C 1/002; C03B 19/08
See application file for complete search history.

(56) References Cited

U.S. PATENT DOCUMENTS

| | | | |
|---|---|---|---|
| 2,611,712 A | 9/1952 | Ford | |
| 4,178,163 A | 12/1979 | Wustefeld | |
| 8,991,213 B1* | 3/2015 | Flack | ...................... C03B 19/08 65/22 |
| 2007/0104949 A1 | 5/2007 | Bunge | |
| 2014/0021419 A1* | 1/2014 | Baier | ...................... C03B 19/08 501/39 |
| 2014/0179509 A1 | 6/2014 | Binhussain et al. | |
| 2016/0264446 A1 | 9/2016 | Youssef et al. | |

FOREIGN PATENT DOCUMENTS

| | | |
|---|---|---|
| CN | 104628240 A | 5/2015 |
| JP | 2005132714 A | 5/2005 |
| JP | 2007506535 A | 3/2007 |
| JP | 2012106876 A | 6/2012 |
| KR | 2010/0003920 A | 1/2010 |
| WO | 2014/058204 A1 | 4/2014 |

OTHER PUBLICATIONS

Yuji Yamaguchi, "Investigation and examination for promotion of reuse, recycling and proper disposal of photovoltaic power generation facilities", INDUST, Dec. 2015 (vol. 30, No. 12) pp. 2-8, Japan Environmental Sanitation Center, and its English translation.
International Search Report for related International Application No. PCT/JP2018/035004 dated Nov. 26, 2018.
International Preliminary Report on Patenability for related International Application No. PCT/JP2018/035004 dated Mar. 5, 2019.
Supplementary European Search Report for European Application No. 18861864.9 dated Apr. 21, 2020.
Allowed claims of parent U.S. Appl. No. 16/620,761, filed Dec. 9, 2019.
Office Action for corresponding Chinese Patent Application No. 201880034532.3 dated Oct. 11, 2021 and its English Machine Translation.

* cited by examiner

*Primary Examiner* — Noah S Wiese
(74) *Attorney, Agent, or Firm* — Renner, Otto, Boisselle & Sklar, LLP

(57) ABSTRACT

To provide a method for recycling a solar cell module glass, which enables development of other novel applications of a waste glass of a solar cell module while controlling an elution amount of Sb from the waste glass into water. Disclosed is a method for recycling a solar cell module glass, the method comprising: grinding a solar cell module glass into a glass powder; adding at least one foaming agent selected from SiC, $CaCO_3$ and a seashell, and a particular inhibitor to the glass powder to produce a mixture; and heating the mixture to 700 to 1,100° C. to produce a foam glass.

8 Claims, No Drawings

METHOD FOR RECYCLING SOLAR CELL MODULE GLASS

TECHNICAL FIELD

The present invention relates to a method for recycling a solar cell module glass, and further relates to a method for recycling a solar cell module glass constituting a photovoltaic power plant.

BACKGROUND ART

Photovoltaic generation attracted attention in terms of conversion to renewable energy considering the accident at the Fukushima Daiichi Nuclear Power Station due to tsunami in Great East Japan Earthquake in March 2011 and the Feed-in Tariff of renewable energy initiated from July 2012 and the like. Photovoltaic power plants from small-scale power plants such as roofs of private houses to large-scale power plants such as mega solar have been actively established.

Meanwhile, since solar cell (or photovoltaic) modules constituting a photovoltaic power plant deteriorate over time, disposal of solar cell modules is becoming a problem. A solar cell module is composed of various parts, and development of a technology that separates disposed solar cell modules into each part and a technology that recycles each separated part is required.

Among such parts, a glass accounts for about 70 to about 80% by weight of a solar cell module. Thus, recycling of the waste glass has an important significance in light of the fact that a large amount of disposed solar cell modules will occur in the future (see line 15 to line 18, left column, page 4, Non Patent Document 1).

Since a solar cell module glass requires high transparency, antimony (Sb) as an antifoaming agent is often added thereto (see the content of antimony in front cover glass in Table 1, page 4, Non Patent Document 1). Although no elution standard value for industrial wastes was specified for antimony, it should be noted that a certain environmental load due to elution is put on a landfill site.

As a recycled product of a waste solar cell module glass, for example, a residential ceramic tile containing about 30% by weight to about 50% by weight of a waste glass has been developed.

PRIOR ART DOCUMENT

Patent Document

Non Patent Document 1: Yuji Yamaguchi, "Investigation and examination for promotion of reuse, recycling and proper disposal of photovoltaic power generation facilities", INDUST, December 2015 (Vol. 30, No. 12) p. 2-8, Japan Environmental Sanitation Center, issued in December 2015

DISCLOSURE OF THE INVENTION

Problems to be Solved by the Invention

The solar cell module glass often contains antimony as mentioned above. The content of antimony in the solar cell module glass may be 5 ppm to 5,000 ppm (see the content of antimony in front cover glass in Table 1, page 4, Non Patent Document 1). It is expected that when the waste glass is used for other applications to produce recycled products, they will be disposed by landfill in the future. Considering the environmental load due to the waste glass, it is required to decrease and control the elution amount of antimony into water.

Furthermore, it is expected that after 2030, the amount of disposed solar cell modules will abruptly increase and reach about 800,000 tons, and thus it can be expected that the amount of the waste glass will reach about 560,000 tons to about 640,000 tons (see FIG. 3, page 6, Non Patent Document 1).

As a recycled product of the waste glass, a "residential ceramic tile" has been developed. However, there is not enough market size to use all of the enormous waste glasses mentioned above, and it can be expected that the market will be saturated soon and waste glasses cannot be treated. Hence, in addition to the "residential ceramic tile", development of other novel applications of the "waste glass" is further required.

As a recycled product of the waste glass, a glass powder, which is simply obtained by finely grinding a glass, may be exemplified. However, since it is mere sand, it is extremely inexpensive, and there is a concern that Sb contained in the glass is eluted into water.

Therefore, an object of the present invention is to provide a method for recycling a solar cell module glass, which enables development of other novel applications of a "waste glass" of a solar cell module while controlling the elution amount of Sb from the "waste glass" into water.

Furthermore, an object is to provide a novel method for recycling a solar cell module.

Means for Solving the Problems

The present inventors have intensively studied and found that a method for recycling a solar cell module glass, the method including adding a particular foaming agent and a particular inhibitor to a solar cell module glass containing antimony (Sb), and foaming the glass to produce a foam glass, enables development of other novel applications of a "waste glass" of a solar cell module while controlling the elution amount of Sb from the "waste glass" into water, thus completing the present invention.

In other words, in an aspect, the present invention provides a method for recycling a solar cell module glass, the method comprising (or including):

grinding (or crushing) a solar cell module glass into a glass powder;

mixing the glass powder with at least one foaming agent selected from SiC, $CaCO_3$ and a seashell, and at least one inhibitor selected from $Ca_3(PO_4)_2$, $CaHPO_4$, $Al(H_2PO_4)_3$, $FeSO_4$, $Fe_2(SO_4)_3$, $Fe_2O_3$, $Al_2(SO_4)_3$ and $CaSO_4$ to produce a mixture; and heating the mixture to 700 to 1,100° C., thereby melting and foaming to produce a foam (or foamed) glass.

In another aspect, the present invention provides a method for recycling a solar cell module, the method including a method for recycling a solar cell module glass.

In a further aspect, the present invention provides a method for producing a foam glass, the method including:

crushing (or grinding) a glass containing antimony to produce a glass powder;

mixing the glass powder with at least one foaming agent selected from SiC, $CaCO_3$, and a seashell, and at least one inhibitor selected from $Ca_3(PO_4)_2$, $CaHPO_4$, $Al(H_2PO_4)_3$, $FeSO_4$, $Fe_2(SO_4)_3$, $Fe_2O_3$, $Al_2(SO_4)_3$ and $CaSO_4$ to obtain a mixture; and heating the mixture to 700 to 1,100° C., followed by melting and foaming.

In a preferred aspect, the present invention provides a foam (or foamed) glass containing antimony, wherein an elution amount of the antimony into water is less than 5 ppm.

Effects of the Invention

A method of an embodiment of the present invention can provide a method for recycling a solar cell panel module glass, which enables development of other novel applications of a "waste glass" of a solar cell module while controlling an elution amount of Sb from the "waste glass" into water.

Furthermore, the method of an embodiment of the present invention can provide a method for recycling a solar cell module, the method including such a method for recycling a solar cell module glass.

The foam glass produced has an inhibited and controlled elution amount of antimony into water, and can be preferably used for various applications as a foam glass.

DESCRIPTION OF EMBODIMENTS

In an aspect, the present invention provides a method for recycling a solar cell module glass, the method comprising (or including):
grinding (or crushing) a solar cell module glass into a glass powder;
mixing the glass powder with at least one foaming agent selected from SiC, $CaCO_3$ and a seashell, and at least one inhibitor selected from $Ca_3(PO_4)_2$, $CaHPO_4$, $Al(H_2PO_4)_3$, $FeSO_4$, $Fe_2(SO_4)_3$, $Fe_2O_3$, $Al_2(SO_4)_3$ and $CaSO_4$ to produce a mixture; and
heating the mixture to 700 to 1,100° C., thereby melting and foaming to produce a foam (or foamed) glass.

As used herein, the "solar cell module" is not particularly limited as long as it is a module for generation of electric power by sunlight constituting a solar panel, a solar cell panel and the like.

As used herein, "solar cell module glass" refers to a glass contained (or constituting) the "solar cell module", and it is not particularly limited as long as it is a glass contained in the "solar cell module", such as a substrate glass, a protective glass, a cover glass and a wire glass.

The "solar cell module glass" sometimes contains antimony (Sb) as an antifoaming agent in order to increase transparency. The content of antimony in the solar cell module glass may be 5 to 5,000 ppm, 5 to 4,000 ppm, or 5 to 3,000 ppm. Furthermore, the lower limit of the content of antimony in the solar cell module glass may be 10 ppm, or 20 ppm.

The "solar cell module glass" may be a borosilicate glass, a soda-lime glass, a blue-plate glass, a white-plate glass and the like, and the solar cell module glass is preferably a white-plate glass and a soda-lime glass in terms of superior transparency.

The "solar cell module glass" is preferably a waste (or disposed) solar cell module glass.

The solar cell module glass is ground into a glass powder. As long as a desired glass powder is obtained, it is possible to appropriately select a grinding method and a grinding device and the like. The solar cell module glass may be ground into a glass powder in two steps in which it is crudely crushed and then it is finely ground, or may be ground into a glass powder in one step in which it is finely ground from the beginning.

The particle size of the glass powder is preferably 1,000 μm or less, and more preferably 500 μm or less.

Therefore, the glass powder after finely ground is screened based on, for example, a particle size of 1,000 μm, and a glass powder having a particle size of more than 1,000 μm can be finely ground again for use. Furthermore, the glass powder after finely ground is screened based on a particle size of 500 μm, and a glass powder having a particle size of more than 500 μm may be finely ground again for use. Screening of a glass powder based on a particle size of 1,000 μm can be performed by using a sieve of No. 18 (ASTM E-11), and screening of a glass powder based on a particle size of 500 μm can be performed by using a sieve of No. 35 (ASTM E-11).

The content of antimony in the glass powder of the solar cell module glass may be 5 to 5,000 ppm, 5 to 4,000 ppm, or 5 to 3,000 ppm. Furthermore, the lower limit of the content of antimony in the glass powder of the solar cell module glass may be 10 ppm, or 20 ppm.

The glass powder is mixed with at least one foaming agent selected from SiC, $CaCO_3$ and a seashell and at least one inhibitor selected from $Ca_3(PO_4)_2$, $CaHPO_4$, $Al(H_2PO_4)_3$, $FeSO_4$, $Fe_2(SO_4)_3$, $Fe_2O_3$, $Al_2(SO_4)_3$ and $CaSO_4$ to produce a mixture.

At least one selected from SiC, $CaCO_3$, and a seashell is used as a foaming agent.

As long as the objective recycling method by the present invention can be performed, each of SiC, $CaCO_3$, and a seashell is not particularly limited.

Furthermore, the foaming agent can be used after appropriately ground, and the particle size thereof is not particularly limited, and it is preferably 1,000 μm or less, and more preferably 500 μm or less. Screening of a foaming agent based on a particle size of 1,000 μm can be performed by using a sieve of No. 18 (ASTM E-11), and screening of a foaming agent based on a particle size of 500 μm can be performed by using a sieve of No. 35 (ASTM E-11).

As the foaming agent, commercially available products can be used. For example, SiC manufactured by YAKUSHIMA DENKO CO., LTD., SiC manufactured by Pacific Rundum Co., Ltd., SiC manufactured by Shinano Electric Refining Co., Ltd., $CaCO_3$ manufactured by Wako Pure Chemical Industries, Ltd., $CaCO_3$ manufactured by KANTO CHEMICAL CO., INC., and $CaCO_3$ manufactured by NACALAI TESQUE, INC. can be used.

As the seashell, a seashell, etc., from marine product processing plants, seashell feed centers, etc., can be used, and a disposal (or waste) seashell can be used. With respect to the seashell, as long as the objective recycling method can be performed, there is no particular limitation on the type, etc., of the seashell.

The foaming agent can be used alone or in combination.

The foaming agent is added in an amount of preferably 0.1 to 15 g, more preferably 0.1 to 10 g, still more preferably 0.2 to 8 g, and particularly preferably 0.2 to 6 g, per 100 g of the glass powder. When the foaming agent is added in an amount of 0.1 to 15 g per 100 g of the glass powder, foamability can be more improved.

At least one selected from $Ca_3(PO_4)_2$, $CaHPO_4$, $Al(H_2PO_4)_3$, $FeSO_4$, $Fe_2(SO_4)_3$, $Fe_2O_3$, $Al_2(SO_4)_3$, and $CaSO_4$ is used as an inhibitor.

It is preferable that at least two including at least one selected from $Ca_3(PO_4)_2$, $CaHPO_4$, $Al(H_2PO_4)_3$, $FeSO_4$, $Fe_2(SO_4)_3$, $Fe_2O_3$, $Al_2(SO_4)_3$, and $CaSO_4$ are used as inhibitors.

It is more preferable that at least two selected from $Ca_3(PO_4)_2$, $CaHPO_4$, $Al(H_2PO_4)_3$, $FeSO_4$, $Fe_2(SO_4)_3$, $Fe_2O_3$, $Al_2(SO_4)_3$, and $CaSO_4$ are used as inhibitors.

As long as the objective recycling method by the present invention can be performed, each of $Ca_3(PO_4)_2$, $CaHPO_4$, $Al(H_2PO_4)_3$, $FeSO_4$, $Fe_2(SO_4)_3$, $Fe_2O_3$, $Al_2(SO_4)_3$, and $CaSO_4$ is not particularly limited.

Furthermore, the inhibitor can be used after appropriately ground, and the particle size thereof is not particularly limited, and it is preferably 1,000 μm or less, and more preferably 500 μm or less. Screening of an inhibitor based on a particle size of 1,000 μm can be performed by using a sieve of No. 18 (ASTM E-11), and screening of an inhibitor based on a particle size of 500 μm can be performed by using a sieve of No. 35 (ASTM E-11).

As the inhibitor, commercially available products can be used. $Ca_3(PO_4)_2$ manufactured by KANTO CHEMICAL CO., INC., $Ca_3(PO_4)_2$ manufactured by Wako Pure Chemical Industries, Ltd., $CaHPO_4$ manufactured by KANTO CHEMICAL CO., INC., $CaHPO_4$ manufactured by NACALAI TESQUE, INC., $Al(H_2PO_4)_3$ manufactured by KANTO CHEMICAL CO., INC., $Al(H_2PO_4)_3$ manufactured by NACALAI TESQUE, INC., $FeSO_4$ manufactured by NACALAI TESQUE, INC., $FeSO_4$ manufactured by KANTO CHEMICAL CO., INC., $Fe_2(SO_4)_3$ manufactured by KANTO CHEMICAL CO., INC., $Fe_2(SO_4)_3$ manufactured by Wako Pure Chemical Industries, Ltd., $Fe_2O_3$ manufactured by KANTO CHEMICAL CO., INC., $Fe_2O_3$ manufactured by Wako Pure Chemical Industries, Ltd., $Al_2(SO_4)_3$ manufactured by KANTO CHEMICAL CO., INC., $Al_2(SO_4)_3$ manufactured by Wako Pure Chemical Industries, Ltd., $CaSO_4$ manufactured by KANTO CHEMICAL CO., INC., and $CaSO_4$ manufactured by Wako Pure Chemical Industries, Ltd. and the like can be used.

The inhibitor can be used alone or in combination.

The inhibitor can be added, for example, in an amount of 0.1 to 25 g, and 0.1 to 20 g, and is added in an amount of preferably 0.1 to 15 g, more preferably 0.1 to 10 g, still more preferably 0.2 to 8 g, and particularly preferably 0.2 to 6 g, per 100 g of the glass powder. When the inhibitor is added in an amount of 0.1 to 25 g per 100 g of the glass powder, more inhibition is possible, and when the inhibitor is added in an amount of 0.1 to 15 g, more appropriate inhibition is possible.

The glass powder is mixed with the foaming agent and the inhibitor until they are uniform, thus obtaining a mixture. A mixing method and mixing device and the like are not particularly limited as long as the objective recycling method by the present invention can be performed.

The mixture thus obtained is heated to 700 to 1,100° C., thereby melting and foaming to produce a foam glass.

A condition, a method a device and the like under/in/with which the mixture is heated to 700 to 1,100° C., followed by melting and foaming, are not particularly limited as long as a foam (or foamed) glass can be produced and the objective recycling method by the present invention can be performed. For example, the heating temperature is more preferably 850° C. to 1,000° C. The heating time is preferably 3 to 30 minutes, more preferably 5 to 20 minutes, and still more preferably 7 to 15 minutes.

It is preferable that the mixture is heated to 700 to 1,100° C. to melt and foam the mixture so that at least one inhibitor selected from $Ca_3(PO_4)_2$, $CaHPO_4$, $Al(H_2PO_4)_3$, $FeSO_4$, $Fe_2(SO_4)_3$, $Fe_2O_3$, $Al_2(SO_4)_3$, and $CaSO_4$ exists in a pore of the foam glass.

When at least one inhibitor selected from $Ca_3(PO_4)_2$, $CaHPO_4$, $Al(H_2PO_4)_3$, $FeSO_4$, $Fe_2(SO_4)_3$, $Fe_2O_3$, $Al_2(SO_4)_3$ and $CaSO_4$ exists in a pore of the foam glass, the foam glass more inhibits elution of antimony preferably.

With respect to the foam glass, the elution amount of antimony was evaluated based on the Notification No. 46 of the Environment Agency, Elution Test (environmental quality standards for soil). Together, also for the glass powder, the elution amount of antimony was evaluated. The details are mentioned in Examples.

The elution amount of antimony from the foam glass into water is preferably less than 5 ppm, more preferably 2.0 ppm or less, still more preferably 1.0 ppm or less, particularly preferably 0.8 ppm or less, and more particularly preferably 0.5 ppm or less.

In another aspect, the present invention provides a method for recycling a solar cell module, the method comprising (or including) the method for recycling a solar cell module glass of an embodiment of the present invention.

In a further aspect, the present invention provides a method for producing a foam glass, the method including (or comprising):

crushing (or grinding) a glass containing antimony to produce a glass powder;

mixing the glass powder with at least one foaming agent selected from SiC, $CaCO_3$ and a seashell, and at least one inhibitor selected from $Ca_3(PO_4)_2$, $CaHPO_4$, $Al(H_2PO_4)_3$, $FeSO_4$, $Fe_2(SO_4)_3$, $Fe_2O_3$, $Al_2(SO_4)_3$ and $CaSO_4$ to obtain a mixture; and heating the mixture to 700 to 1,100° C., followed by melting and foaming.

Various embodiments mentioned in the method for recycling a solar cell module mentioned above can be applied to the method for producing a foam glass unless there is a particular problem.

The content of antimony in the glass containing antimony may be 5 to 5,000 ppm, 5 to 4,000 ppm, or 5 to 3,000 ppm. Furthermore, the lower limit of the content of antimony in the glass containing antimony may be 10 ppm, or 20 ppm.

The glass containing antimony is preferably a solar cell module glass, and more preferably a waste solar cell module glass.

The foaming agent is added in an amount of preferably 0.1 to 15 g, more preferably 0.1 to 10 g, still more preferably 0.2 to 8 g, and particularly preferably 0.2 to 6 g, per 100 g of the glass powder.

The inhibitor can be added, for example, in an amount of 0.1 to 25 g, and 0.1 to 20 g, and is added in an amount of preferably 0.1 to 15 g, more preferably 0.1 to 10 g, still more preferably 0.2 to 8 g, and particularly preferably 0.2 to 6 g, per 100 g of the glass powder.

The production method preferably comprises heating the mixture to 700 to 1,100° C., followed by melting and foaming so that at least one inhibitor selected from $Ca_3(PO_4)_2$, $CaHPO_4$, $Al(H_2PO_4)_3$, $FeSO_4$, $Fe_2(SO_4)_3$, $Fe_2O_3$, $Al_2(SO_4)_3$ and $CaSO_4$ exists in a pore of the glass foam (or foam glass).

The elution amount of antimony from the foam glass into water is preferably less than 5 ppm, more preferably 2.0 ppm or less, still more preferably 1.0 ppm or less, particularly preferably 0.8 ppm or less, and more particularly preferably 0.5 ppm or less.

In a preferred aspect, the present invention provides
a foam glass containing antimony, wherein
an elution amount of antimony into water is less than 5 ppm.

Various embodiments mentioned in the method for recycling a solar cell module and the method for producing a foam glass mentioned above can be applied to a foam glass unless there is a particular problem.

In the foam glass of an embodiment of the present invention, it is preferable that at least one inhibitor selected from $Ca_3(PO_4)_2$, $CaHPO_4$, $Al(H_2PO_4)_3$, $FeSO_4$, $Fe_2(SO_4)_3$, $Fe_2O_3$, $Al_2(SO_4)_3$ and $CaSO_4$ exists in a pore of the foam glass.

The content of antimony in the foam glass of an embodiment of the present invention may be 5 to 5,000 ppm, 5 to 4,000 ppm, or 5 to 3,000 ppm. Furthermore, the lower limit of the content of antimony in the foam glass may be 10 ppm, or 20 ppm.

The elution amount of antimony from the foam glass into water is preferably less than 5 ppm, more preferably 2.0 ppm or less, still more preferably 1.0 ppm or less, particularly preferably 0.8 ppm or less, and more particularly preferably 0.5 ppm or less.

A reason why it is possible to inhibit the elution amount of antimony from the foam glass obtained by the method for recycling a solar cell module of an embodiment of the present invention, etc., is considered to be as follows, but the invention of the present application is not limited due to this reason in any way.

The elution amount of antimony from the glass containing antimony into water is not high, but when the glass is ground into a glass powder, the elution amount becomes high, and furthermore, when the glass is made into a foam glass, the elution amount becomes higher. This is considered to be because the surface area of the glass is increased, and thus the opportunity for antimony in the glass to be in contact with water is increased.

Therefore, when a foaming agent is added to a glass powder containing antimony, followed by heating and melting to produce a foam glass, the elution amount of antimony into water is increased, which is unpreferable.

The present inventors have found that when a particular inhibitor is added, followed by heating and melting to produce a foam glass, the elution amount of antimony into water is decreased (inhibited) compared with the elution amount into water of antimony in a foam glass produced without addition of an inhibitor.

This is considered to be because the inhibitor exists on the surface of the foam glass and in a pore inside of the foam glass, thus preventing (or inhibiting) the elution of antimony.

Since the foam glass obtained by the method for recycling a solar cell module of an embodiment of the present invention, etc., exhibits a similar nature to that of an usual foam glass, it can be similarly used for, for example, artificial lightweight aggregates, building heat-insulating materials, acoustic-insulating materials, and other applications of a foam glass and the like.

Furthermore, the foam glass of an embodiment of the present invention can be disposed.

EXAMPLES

The present invention will be described below by way of Examples and Comparative Examples. It should be noted, however, each of these Examples is merely an embodiment of the present invention and the present invention is in no way limited thereto.

Components used in these Examples will be shown below.
(A) Glass
(a1) Disposed solar cell module glass (containing about 1,100 ppm of Sb)

(B) Foaming agent
(b1) SiC (Diyasic (trade name) manufactured by YAKUSHIMA DENKO CO., LTD.)
(b2) $CaCO_3$ (Calcium Carbonate (trade name) manufactured by Wako Pure Chemical Industries, Ltd.)
(b3) Seashell (mussel)
(C) Inhibitor
(c1) $Al_2(SO_4)_3$ (aluminium sulfate, 14-18 water (trade name) manufactured by KANTO CHEMICAL CO., INC.)
(c2) $Fe_2O_3$ (Iron(III) oxide (trade name) manufactured by KANTO CHEMICAL CO., INC.)
(c3) $CaSO_4$ (Calcium sulfate dihydrate (trade name) manufactured by KANTO CHEMICAL CO., INC.)

Production and Evaluation for Sb Elution of Foam Glass of Example 1

(a1) The disposed solar cell module glass was crudely crushed, and then further finely ground to be a glass powder. The glass powder was screened based on particle size to collect the glass powder with a particle size of 500 μm or less. A glass powder with a particle size of more than 500 μm was finely ground again.

Then, 50 g of a glass powder was mixed with 0.25 g of (b1) SiC and 1.00 g of (c1) $Al_2(SO_4)_3$ to produce a mixture. This mixture was heated at about 910° C. for about 10 minutes to obtain a foam glass of Example 1. The foam glass of Example 1 was porous (form or structure).

The foam glass of Example 1 was ground to be a glass powder. The glass powder was screened based on particle size to collect a glass powder with a particle size of 500 μm or less. Then, 10 g of this glass powder was put into 100 g of distilled water, and the mixture was shaken at room temperature (20 to 30° C.) for about 3 hours, followed by filtration to obtain a sample filtrate. Then, 40 mL of the sample filtrate was taken, and 1 mL of an aqueous hydrochloric acid solution (concentrated hydrochloric acid:distilled water=1:1) was added to this. Distilled water was further added to make a total of 50 mL, thus obtaining an analysis sample. This analysis sample was analyzed with a high-frequency plasma emission spectrometer (manufactured by SII NANOTECHNOLOGY INC., SPS3100 (trade name)). The analysis sample was prepared twice, and the mean value was regarded as the Sb concentration of the analysis sample. The Sb concentration of the analysis sample was 0.68 ppm (mg/L). The Sb concentration of the sample filtrate was 0.85 ppm obtained by multiplying the Sb concentration of the analysis sample by 1.25. The result is shown in Table 1.

Production and Evaluation for Sb Elution of Foam Glasses of Example 2 to Example 18

Foam glasses of Examples 2 to 18 were produced by using the same method as mentioned in Example 1, except that the foaming agent and the inhibitor mentioned in Tables 1 to 2 were used in the amount mentioned in Tables 1 to 2, and that the foam glasses were produced under the condition mentioned in Tables 1 to 2. All of the foam glasses of Examples 2 to 18 were porous. The foam glasses thus obtained were evaluated for elution of Sb using the same method as mentioned in Example 1. The results are shown in Tables 1 to 2.

Production and Evaluation for Sb Elution of Foam Glasses of Comparative Examples 1 to 3

Foam glasses of Comparative Examples 1 to 3 were produced by using the same method as mentioned in Example 1, except that the foaming agent mentioned in Table 3 was used in the amount mentioned in Table 3 and no inhibitor was used at all, and that the foam glasses were produced under the condition mentioned in Table 3. All of the foam glasses of Comparative Examples 1 to 3 were porous. The foam glasses thus obtained were evaluated for elution of Sb using the same method as mentioned in Example 1. The results are shown in Table 3.

Comparative Example 4: Evaluation for Sb Elution of the Solar Cell Module Glass (Powder)

Elution of Sb from the glass powder itself of (a1) disposed solar cell module glass mentioned in Example 1 was evaluated. Therefore, the glass powder of Comparative Example 4 was a powder.

First, 10 g of the glass powder of (a1) disposed solar cell module glass was put into 100 g of distilled water, and the mixture was shaken at room temperature of 25° C. for about 3 hours, followed by filtration to obtain a sample filtrate. Then, 40 mL of the sample filtrate was taken, and 1 mL of an aqueous hydrochloric acid solution (concentrated hydrochloric acid:distilled water=1:1) was added to this. Distilled water was further added to make a total of 50 mL, thus obtaining an analysis sample. This analysis sample was evaluated for elution of Sb using the same method as mentioned in Example 1. The result is shown in Table 3.

Comparative Example 5: Content of Sb Contained in the Solar Cell Module Glass

To 500 mg of the glass powder of (a1) disposed solar cell module glass, 1.5 g of sodium carbonate and 0.5 g of boric acid were added, then melting the glass powder. To this, about 10 mL of an aqueous hydrochloric acid solution (concentrated hydrochloric acid:distilled water=1:1) was added, and the solution was heated and dissolved. The amount of the aqueous solution decreased during heating, and thus a small amount of the aqueous hydrochloric acid solution was added. After about 20 minutes, 10 mL of an aqueous 0.05% by weight glycol solution was added, followed by stirring. After about 5 minutes, this solution was filtered. Since an insoluble matter presented in the filter paper, a small amount of an aqueous hot hydrochloric acid solution (concentrated hydrochloric acid:distilled water=1:50) was added to dissolve. After this procedure was repeated, distilled water was added to the filtrate to make a total of 250 mL, thus obtaining an analysis sample. This analysis sample was analyzed with a high-frequency plasma emission spectrometer (manufactured by SII NANOTECHNOLOGY INC., SPS3100 (trade name)). The analysis sample was prepared twice, and the mean value was regarded as the Sb concentration of the analysis sample. The Sb concentration of the analysis sample was 2.10 ppm (mg/L).

Since the specific gravity of the analysis sample is about 1.0, the weight of 250 mL of the sample is 250 g. The weight of Sb contained in the analysis sample is 250,000 mg×2.1× $10^{-6}$=0.525 mg. Since Sb with this weight is contained in 500 mg of the glass, the concentration of Sb contained in the glass powder is about 1,100 ppm calculated from the equation of 0.525/500=0.00105.

As shown in Comparative Example 5, about 1,100 ppm of antimony (Sb) is contained in (a1) solar cell module glass.

As shown in Comparative Example 4, the Sb concentration of the eluate resulting from contact between water and the glass powder (powder) obtained by grinding the (a1) module glass is 0.17 ppm.

As shown in Comparative Examples 1 to 3, the Sb concentration of the eluate resulting from contact between water and the foam glass obtained from the (a1) module glass is 0.55 to 0.97 ppm. Both are higher than the Sb concentration of the eluate resulting from contact between water and the glass powder of Comparative Example 4. This is considered to be because the surface area of the glass is increased, and the contact area between water and the glass is increased.

Therefore, when a foam glass is produced from a solar cell module glass, the Sb concentration of the eluate obtained from contact between water and the glass is increased.

Production of Foam Glasses of Example 21 to Example 166

Foam glasses of Examples 21 to 166 were produced by using the same method as mentioned in Example 1, except that the foaming agent and the inhibitor mentioned in Tables 4 to 13 were used in the amount mentioned in Tables 4 to 13, and that the foam glasses were produced under the condition mentioned in Tables 4 to 13. All of the foam glasses of Examples 21 to 166 were porous.

Evaluation for Sb Elution of the Foam Glasses of Example 21 to Example 166

In the method for evaluating Sb elution used in Example 1, the lower limit of measurement of Sb concentration was about 0.05 ppm. In order to measure the Sb concentration to a lower concentration (about 0.001 ppm), the following method was used for evaluation for Sb elution of the foam glasses of Example 21 to Example 166.

The foam glass of each Examples was ground to make each glass powder. Each glass powder was screened based on particle size to collect each glass powder with a particle size of 500 μm or less. Then, 50 mL of distilled water was added to 5 g of each foam glass, and the mixture was shaken at room temperature (20 to 30° C.) for about 3 hours, followed by filtration to obtain each sample filtrate. Then, 40 mL of each sample filtrate was taken, and 1 mL of a hydrochloric acid solution (concentrated hydrochloric acid:distilled water=1:1) and thiourea (0.1 mol/L) were added to this. Distilled water was further added to make a total of 50 mL, thus obtaining each analysis sample.

Each analysis sample was analyzed using a hydride generator (manufactured by SII NANOTECHNOLOGY INC.) and a high-frequency plasma emission spectrometer (manufactured by SII NANOTECHNOLOGY INC., SPS3000 (trade name)).

For each Example, the analysis sample was prepared twice, and the mean value was regarded as the Sb concentration of the analysis sample. The Sb concentration of the sample filtrate was obtained by multiplying the Sb concentration of the analysis sample by 1.25. For example, in Example 21, the concentration was 0.028 ppm.

The results of the foam glasses of Examples 21 to 166 are shown in Tables 4 to 13.

All of the foam glasses of Examples 1 to 166 are foam glasses obtained by mixing the glass powder of the disposal glass of the solar cell module with at least one foaming agent and at least one inhibitor, followed by heating and foaming.

The foam glasses of Examples 1 to 6 correspond to the foam glass of Comparative Example 1 in terms of the foaming agent, the foam glasses of Examples 7 to 12 correspond to the foam glass of Comparative Example 2 in terms of the foaming agent, and the foam glasses of Examples 13 to 18 correspond to the foam glass of Comparative Example 3 in terms of the foaming agent. The Sb concentration of the eluate obtained from contact between water and a foam glass of an Example is lower than the Sb concentration of the eluate obtained from contact between water and the foam glass of the corresponding Comparative Example.

Furthermore, Examples 4 to 6, 10 to 12, and 16 to 18 show that when at least two inhibitors are used, the Sb concentration of the eluate obtained from contact between water and the foam glass is further lower.

Furthermore, Examples 21 to 166 show that when at least two inhibitors are used and the amount, etc., of the inhibitors is adjusted, the Sb concentration of the eluate obtained from contact between water and the foam glass may be further decreased.

The above results show that when even a foam glass whose raw material is a solar cell module glass containing Sb is produced using the method of the present invention, it is possible to inhibit and control the elution amount of Sb from the foam glass thus produced into water.

Therefore, such a foam glass can be utilized for various applications as a usual foam glass.

TABLE 1

| | | Example | | | | | | | | | |
|---|---|---|---|---|---|---|---|---|---|---|---|
| | | 1 | 2 | 3 | 4 | 5 | 6 | 7 | 8 | 9 | 10 |
| (A) | | | | | | | | | | | |
| (a1) | g | 50 | 50 | 50 | 50 | 50 | 50 | 50 | 50 | 50 | 50 |
| (B) | | | | | | | | | | | |
| (b1) | g | 0.25 | 0.25 | 0.25 | 0.25 | 0.25 | 0.25 | | | | |
| (b2) | g | | | | | | | 0.75 | 0.75 | 0.75 | 0.75 |
| (b3) | g | | | | | | | | | | |
| (C) | | | | | | | | | | | |
| (c1) | g | 1.0 | | | 1.0 | 1.0 | | 1.0 | | | 1.0 |
| (c2) | g | | 1.0 | | 1.0 | | 1.0 | | 1.0 | | 1.0 |
| (c3) | g | | | 1.0 | | 1.0 | 1.0 | | | 1.0 | |
| Heating temperature | °C. | 960 | 960 | 960 | 960 | 960 | 960 | 920 | 920 | 920 | 920 |
| Heating time | min | 10 | 10 | 10 | 10 | 10 | 10 | 10 | 10 | 10 | 10 |
| Form a) | | pr | pr | pr | pr | pr | pr | pr | pr | pr | pr |
| Sb concentration | ppm | 0.85 | 0.12 | 0.66 | 0.08 | 0.18 | 0.10 | 0.10 | 0.25 | 0.20 | 0.06 | a) pr: porous, pw: powder

TABLE 2

| | | Example | | | | | | | |
|---|---|---|---|---|---|---|---|---|---|
| | | 11 | 12 | 13 | 14 | 15 | 16 | 17 | 18 |
| (A) | | | | | | | | | |
| (a1) | g | 50 | 50 | 50 | 50 | 50 | 50 | 50 | 50 |
| (B) | | | | | | | | | |
| (b1) | g | | | | | | | | |
| (b2) | g | 0.75 | 0.75 | | | | | | |
| (b3) | g | | | 0.90 | 0.90 | 0.90 | 0.90 | 0.90 | 0.90 |
| (C) | | | | | | | | | |
| (c1) | g | 1.0 | | 1.0 | | | 1.0 | 1.0 | |
| (c2) | g | | 1.0 | | 1.0 | | 1.0 | | 1.0 |
| (c3) | g | 1.0 | 1.0 | | | 1.0 | | 1.0 | 1.0 |
| Heating temperature | °C. | 920 | 920 | 910 | 910 | 910 | 910 | 910 | 910 |
| Heating time | min | 10 | 10 | 10 | 10 | 10 | 10 | 10 | 10 |
| Form a) | | pr | pr | pr | pr | pr | pr | pr | pr |
| Sb concentration | ppm | 0.07 | 0.09 | 0.12 | 0.18 | 0.21 | 0.07 | 0.08 | 0.08 | a) pr: porous, pw: powder

TABLE 3

|  |  | Comparative Example | | | |
|---|---|---|---|---|---|
|  |  | 1 | 2 | 3 | 4 |
| (A) | | | | | |
| (a1) | g | 50 | 50 | 50 | 50 |
| (B) | | | | | |
| (b1) | g | 0.25 | | | |
| (b2) | g | | 0.75 | | |
| (b3) | g | | | 0.90 | |

TABLE 3-continued

|  |  | Comparative Example | | | |
|---|---|---|---|---|---|
|  |  | 1 | 2 | 3 | 4 |
| (C) | | | | | |
| (c1) | g | | | | |
| (c2) | g | | | | |
| (c3) | g | | | | |
| Heating temperature | ° C. | 920 | 920 | 920 | |
| Heating time | min | 10 | 10 | 10 | |
| Form a) | | pr | pr | pr | pw |
| Sb concentration | ppm | 0.97 | 0.55 | 0.60 | 0.17 | a) pr: porous, pw: powder

TABLE 4

|  |  | Example | | | | | | | | | | | |
|---|---|---|---|---|---|---|---|---|---|---|---|---|
|  |  | 21 | 22 | 23 | 24 | 25 | 26 | 27 | 28 | 31 | 32 | 33 | 34 |
| (A) | | | | | | | | | | | | | |
| (a1) | g | 50 | 50 | 50 | 50 | 50 | 50 | 50 | 50 | 50 | 50 | 50 | 50 |
| (B) | | | | | | | | | | | | | |
| (b1) | g | 0.25 | 0.25 | 0.25 | 0.25 | 0.25 | 0.25 | 0.25 | 0.4 | | | | |
| (b2) | g | | | | | | | | | 1.25 | 1.25 | 1.25 | 1.25 |
| (b3) | g | | | | | | | | | | | | |
| (C) | | | | | | | | | | | | | |
| (c1) | g | 3 | 2 | 3 | 4 | | | | | 1 | 1 | 1 | 1 |
| (c2) | g | 3 | 3 | 2 | 4 | 3 | 2 | 3 | 4 | 2 | 2.5 | 3 | |
| (c3) | g | | | | | 3 | 3 | 2 | 4 | | | | 2.5 |
| Heating temperature | ° C. | 960 | 960 | 960 | 960 | 960 | 960 | 960 | 960 | 920 | 930 | 930 | 930 |
| Heating time | min | 10 | 10 | 10 | 10 | 10 | 10 | 10 | 10 | 20 | 20 | 20 | 20 |
| Form a) | | pr | pr | pr | pr | pr | pr | pr | pr | pr | pr | pr | pr |
| Sb concentration | ppm | 0.028 | 0.025 | 0.023 | 0.018 | 0.021 | 0.040 | 0.038 | 0.038 | 0.015 | 0.010 | 0.004 | 0.023 | a) pr: porous, pw: powder

TABLE 5

|  |  | Example | | | | | | | | | |
|---|---|---|---|---|---|---|---|---|---|---|---|
|  |  | 35 | 36 | 37 | 38 | 41 | 42 | 43 | 44 | 45 | 46 |
| (A) | | | | | | | | | | | |
| (a1) | g | 50 | 50 | 50 | 50 | 50 | 50 | 50 | 50 | 50 | 50 |
| (B) | | | | | | | | | | | |
| (b1) | g | | | | | | | | | | |
| (b2) | g | 1.25 | 1.25 | 1.25 | 1.25 | | | | | | |
| (b3) | g | | | | | 1.25 | 1.25 | 1.25 | 1.25 | 1.25 | 1.25 |
| (C) | | | | | | | | | | | |
| (c1) | g | | | | | 1 | 1 | 1 | | | |
| (c2) | g | 3 | 2 | 3 | 2.5 | 2 | 2.2 | 2.4 | 2 | 1 | 2 |
| (c3) | g | 3 | 3 | 2 | 2.5 | | | | 2 | 2 | 1 |
| Heating temperature | ° C. | 920 | 920 | 920 | 920 | 920 | 920 | 920 | 920 | 920 | 920 |
| Heating time | min | 20 | 20 | 20 | 20 | 20 | 20 | 20 | 20 | 20 | 20 |
| Form a) | | pr | pr | pr | pr | pr | pr | pr | pr | pr | pr |
| Sb concentration | ppm | 0.019 | 0.022 | 0.016 | 0.015 | 0.035 | 0.018 | 0.022 | 0.030 | 0.027 | 0.016 | a) pr: porous, pw: powder

TABLE 6

| | | Example | | | | | | | | | | |
|---|---|---|---|---|---|---|---|---|---|---|---|---|
| | | 51 | 52 | 53 | 54 | 55 | 56 | 57 | 61 | 62 | 63 | 64 |
| (A) | | | | | | | | | | | | |
| (a1) | g | 50 | 50 | 50 | 50 | 50 | 50 | 50 | 50 | 50 | 50 | 50 |
| (B) | | | | | | | | | | | | |
| (b1) | g | 0.25 | 0.25 | 0.25 | 0.25 | 0.25 | 0.25 | 0.40 | | | | |
| (b2) | g | | | | | | | | 1.25 | 1.25 | 1.25 | 1.25 |
| (b3) | g | | | | | | | | | | | |
| (C) | | | | | | | | | | | | |
| (c1) | g | 3 | 2 | 4 | | | | | 1 | 1 | 1 | 1 |
| (c2) | g | 3 | 3 | 4 | 3 | 2 | 3 | 4 | 2 | 2.5 | 3 | |
| (c3) | g | | | | 3 | 3 | 2 | 4 | | | | 2 |
| Heating temperature | °C. | 970 | 970 | 970 | 970 | 970 | 970 | 970 | 960 | 960 | 960 | 960 |
| Heating time | min | 10 | 10 | 10 | 10 | 10 | 10 | 10 | 20 | 20 | 20 | 20 |
| Form a) | | pr | pr | pr | pr | pr | pr | pr | pr | pr | pr | pr |
| Sb concentration | ppm | 0.020 | 0.019 | 0.019 | 0.009 | 0.018 | 0.013 | 0.010 | 0.019 | 0.022 | 0.018 | 0.012 | a) pr: porous, pw: powder

TABLE 7

| | | Example | | | | | | | | | |
|---|---|---|---|---|---|---|---|---|---|---|---|
| | | 65 | 66 | 67 | 68 | 71 | 72 | 73 | 74 | 75 | 76 |
| (A) | | | | | | | | | | | |
| (a1) | g | 50 | 50 | 50 | 50 | 50 | 50 | 50 | 50 | 50 | 50 |
| (B) | | | | | | | | | | | |
| (b1) | g | | | | | | | | | | |
| (b2) | g | 1.25 | 1.25 | 1.25 | 1.25 | | | | | | |
| (b3) | g | | | | | 1.25 | 1.25 | 1.25 | 1.25 | 1.25 | 1.25 |
| (C) | | | | | | | | | | | |
| (c1) | g | 1 | | | | 1 | 1 | 1 | | | |
| (c2) | g | | 3 | 2 | 3 | 2 | 2.2 | 2.4 | 2 | 1 | 2 |
| (c3) | g | 2.5 | 3 | 3 | 2 | | | | 2 | 2 | 1 |
| Heating temperature | °C. | 960 | 960 | 960 | 960 | 930 | 930 | 930 | 930 | 930 | 930 |
| Heating time | min | 20 | 20 | 20 | 20 | 20 | 20 | 20 | 20 | 20 | 20 |
| Form a) | | pr | pr | pr | pr | pr | pr | pr | pr | pr | pr |
| Sb concentration | ppm | 0.016 | 0.007 | 0.009 | 0.011 | 0.016 | 0.020 | 0.024 | 0.012 | 0.019 | 0.029 | a) pr: porous, pw: powder

TABLE 8

| | | Example | | | | | | | | | | | |
|---|---|---|---|---|---|---|---|---|---|---|---|---|---|
| | | 81 | 82 | 83 | 84 | 85 | 86 | 87 | 88 | 91 | 92 | 93 | 94 |
| (A) | | | | | | | | | | | | | |
| (a1) | g | 50 | 50 | 50 | 50 | 50 | 50 | 50 | 50 | 50 | 50 | 50 | 50 |
| (B) | | | | | | | | | | | | | |
| (b1) | g | 0.25 | 0.25 | 0.25 | 0.25 | 0.25 | 0.25 | 0.25 | 0.40 | | | | |
| (b2) | g | | | | | | | | | 1.25 | 1.25 | 1.25 | 1.25 |
| (b3) | g | | | | | | | | | | | | |
| (C) | | | | | | | | | | | | | |
| (c1) | g | 3 | 2 | 3 | 4 | | | | | 1 | 1 | 1 | 1 |
| (c2) | g | 3 | 3 | 2 | 4 | 3 | 2 | 3 | 4 | 2 | 2.5 | 3 | |
| (c3) | g | | | | | 3 | 3 | 2 | 4 | | | | 2 |

TABLE 8-continued

| | | Example | | | | | | | | | | | |
|---|---|---|---|---|---|---|---|---|---|---|---|---|---|
| | | 81 | 82 | 83 | 84 | 85 | 86 | 87 | 88 | 91 | 92 | 93 | 94 |
| Heating temperature | °C. | 980 | 980 | 980 | 980 | 980 | 980 | 980 | 980 | 970 | 970 | 970 | 970 |
| Heating time | min | 10 | 10 | 10 | 10 | 10 | 10 | 10 | 10 | 20 | 20 | 20 | 20 |
| Form a) | | pr | pr | pr | pr | pr | pr | pr | pr | pr | pr | pr | pr |
| Sb concentration | ppm | 0.022 | 0.021 | 0.025 | 0.018 | 0.028 | 0.036 | 0.023 | 0.025 | 0.037 | 0.027 | 0.028 | 0.016 | a) pr: porous, pw: powder

TABLE 9

| | | Example | | | | | | | | |
|---|---|---|---|---|---|---|---|---|---|---|
| | | 95 | 96 | 97 | 98 | 101 | 102 | 103 | 104 | 105 | 106 |
| (A) | | | | | | | | | | |
| (a1) | g | 50 | 50 | 50 | 50 | 50 | 50 | 50 | 50 | 50 | 50 |
| (B) | | | | | | | | | | |
| (b1) | g | | | | | | | | | | |
| (b2) | g | 1.25 | 1.25 | 1.25 | 1.25 | | | | | | |
| (b3) | g | | | | | 1.25 | 1.25 | 1.25 | 1.25 | 1.25 | 1.25 |
| (C) | | | | | | | | | | |
| (c1) | g | 1 | | | | 1 | 1 | 1 | | | |
| (c2) | g | | 2 | 3 | 2.5 | 2 | 2.2 | 2.4 | 2 | 1 | 2 |
| (c3) | g | 2.5 | 3 | 2 | 2.5 | | | | 2 | 2 | 1 |
| Heating temperature | °C. | 970 | 970 | 970 | 970 | 940 | 940 | 940 | 940 | 940 | 940 |
| Heating time | min | 20 | 20 | 20 | 20 | 20 | 20 | 20 | 20 | 20 | 20 |
| Form a) | | pr | pr | pr | pr | pr | pr | pr | pr | pr | pr |
| Sb concentration | ppm | 0.015 | 0.016 | 0.013 | 0.013 | 0.029 | 0.027 | 0.023 | 0.017 | 0.025 | 0.047 | a) pr: porous, pw: powder

TABLE 10

| | | Example | | | | | | | | | | | |
|---|---|---|---|---|---|---|---|---|---|---|---|---|---|
| | | 111 | 112 | 113 | 114 | 115 | 116 | 117 | 118 | 121 | 122 | 123 | 124 |
| (A) | | | | | | | | | | | | | |
| (a1) | g | 50 | 50 | 50 | 50 | 50 | 50 | 50 | 50 | 50 | 50 | 50 | 50 |
| (B) | | | | | | | | | | | | | |
| (b1) | g | 0.5 | 0.5 | 0.5 | 0.5 | 0.5 | 0.5 | 0.5 | 0.5 | | | | |
| (b2) | g | | | | | | | | | 1.5 | 1.5 | 1.3 | 1.3 |
| (b3) | g | | | | | | | | | | | | |
| (C) | | | | | | | | | | | | | |
| (c1) | g | 3 | 2 | 3 | 4 | | | | | 1 | 1 | 1 | |
| (c2) | g | 3 | 3 | 2 | 4 | 3 | 2 | 3 | 4 | 2 | 3 | | 2 |
| (c3) | g | | | | | 3 | 3 | 2 | 4 | | | 2 | 3 |
| Heating temperature | °C. | 970 | 970 | 970 | 970 | 970 | 970 | 970 | 970 | 950 | 950 | 960 | 950 |
| Heating time | min | 10 | 10 | 10 | 10 | 10 | 10 | 10 | 10 | 20 | 20 | 20 | 20 |
| Form a) | | pr | pr | pr | pr | pr | pr | pr | pr | pr | pr | pr | pr |
| Sb concentration | ppm | 0.030 | 0.026 | 0.055 | 0.033 | 0.018 | 0.021 | 0.013 | 0.015 | 0.004 | 0.003 | 0.015 | 0.008 | a) pr: porous, pw: powder

TABLE 11

|  |  | Example | | | | | | |
|---|---|---|---|---|---|---|---|---|
|  |  | 125 | 126 | 131 | 132 | 133 | 134 | 135 |
| (A) |  |  |  |  |  |  |  |  |
| (a1) | g | 50 | 50 | 50 | 50 | 50 | 50 | 50 |
| (B) |  |  |  |  |  |  |  |  |
| (b1) | g |  |  |  |  |  |  |  |
| (b2) | g | 1.3 | 1.3 |  |  |  |  |  |
| (b3) | g |  |  | 1.3 | 1.3 | 1.3 | 1.3 | 1.3 |
| (C) |  |  |  |  |  |  |  |  |
| (c1) | g |  |  | 1 | 1 | 1 |  |  |
| (c2) | g | 3 | 2.5 | 2 | 2.2 | 2.4 | 1 | 2 |
| (c3) | g | 2 | 2.5 |  |  |  | 2 | 1 |
| Heating temperature | °C. | 950 | 950 | 930 | 930 | 930 | 930 | 930 |
| Heating time | min | 20 | 20 | 20 | 20 | 20 | 20 | 20 |
| Form a) |  | pr | pr | pr | pr | pr | pr | pr |
| Sb concentration | ppm | 0.009 | 0.012 | 0.010 | 0.010 | 0.013 | 0.012 | 0.014 | a) pr: porous, pw: powder

TABLE 12

|  |  | Example | | | | | | | | | | | |
|---|---|---|---|---|---|---|---|---|---|---|---|---|---|
|  |  | 141 | 142 | 143 | 144 | 145 | 146 | 147 | 148 | 151 | 152 | 153 | 154 |
| (A) |  |  |  |  |  |  |  |  |  |  |  |  |  |
| (a1) | g | 50 | 50 | 50 | 50 | 50 | 50 | 50 | 50 | 50 | 50 | 50 | 50 |
| (B) |  |  |  |  |  |  |  |  |  |  |  |  |  |
| (b1) | g | 0.5 | 0.5 | 0.5 | 0.5 | 0.5 | 0.5 | 0.5 | 0.5 |  |  |  |  |
| (b2) | g |  |  |  |  |  |  |  |  | 1.5 | 1.5 | 1.5 | 1.3 |
| (b3) | g |  |  |  |  |  |  |  |  |  |  |  |  |
| (C) |  |  |  |  |  |  |  |  |  |  |  |  |  |
| (c1) | g | 3 | 2 | 3 | 4 |  |  |  |  | 1 | 1 | 1 | 1 |
| (c2) | g | 3 | 3 | 2 | 4 | 3 | 2 | 3 | 4 | 2 | 2.5 | 3 |  |
| (c3) | g |  |  |  |  | 3 | 3 | 2 | 4 |  |  |  | 2 |
| Heating temperature | °C. | 970 | 970 | 970 | 970 | 970 | 970 | 970 | 970 | 960 | 960 | 960 | 970 |
| Heating time | min | 20 | 20 | 20 | 20 | 20 | 20 | 20 | 20 | 20 | 20 | 20 | 20 |
| Form a) |  | pr | pr | pr | pr | pr | pr | pr | pr | pr | pr | pr | pr |
| Sb concentration | ppm | 0.044 | 0.051 | 0.042 | 0.039 | 0.014 | 0.024 | 0.012 | 0.013 | 0.003 | 0.002 | 0.001 | 0.014 | a) pr: porous, pw: powder

TABLE 13

|  |  | Example | | | | | | | | | | |
|---|---|---|---|---|---|---|---|---|---|---|---|---|
|  |  | 155 | 156 | 157 | 158 | 159 | 161 | 162 | 163 | 164 | 165 | 166 |
| (A) |  |  |  |  |  |  |  |  |  |  |  |  |
| (a1) | g | 50 | 50 | 50 | 50 | 50 | 50 | 50 | 50 | 50 | 50 | 50 |
| (B) |  |  |  |  |  |  |  |  |  |  |  |  |
| (b1) | g |  |  |  |  |  |  |  |  |  |  |  |
| (b2) | g | 1.3 | 1.3 | 1.3 | 1.3 | 1.3 |  |  |  |  |  |  |
| (b3) | g |  |  |  |  |  | 1.3 | 1.3 | 1.3 | 1.3 | 1.3 | 1.3 |
| (C) |  |  |  |  |  |  |  |  |  |  |  |  |
| (c1) | g | 1 |  |  |  |  | 1 | 1 | 1 |  |  |  |
| (c2) | g |  | 3 | 2 | 3 | 2.5 | 2 | 2.2 | 2.4 | 2 | 1 | 2 |
| (c3) | g | 2.5 | 3 | 3 | 2 | 2.5 |  |  |  | 2 | 2 | 1 |

TABLE 13-continued

| | | Example | | | | | | | | | | |
|---|---|---|---|---|---|---|---|---|---|---|---|
| | | 155 | 156 | 157 | 158 | 159 | 161 | 162 | 163 | 164 | 165 | 166 |
| Heating temperature | ° C. | 970 | 960 | 960 | 960 | 960 | 940 | 940 | 940 | 940 | 940 | 940 |
| Heating time | min | 20 | 20 | 20 | 20 | 20 | 20 | 20 | 20 | 20 | 20 | 20 |
| Form a) | | pr | pr | pr | pr | pr | pr | pr | pr | pr | pr | pr |
| Sb concentration | ppm | 0.013 | 0.006 | 0.007 | 0.006 | 0.007 | 0.004 | 0.002 | 0.005 | 0.009 | 0.010 | 0.023 | a) pr: porous, pw: powder

INDUSTRIAL APPLICABILITY

When a foam glass is produced with a glass containing Sb using the method of the present invention, it is possible to inhibit and control the elution concentration of Sb from the foam glass into water. Therefore, the foam glass produced by the method of the present invention can be used for various applications such as, for example, artificial lightweight aggregates, building heat-insulating materials, acoustic-insulating materials, and other applications of a foam glass. The method of the invention of the present application accompanied by production of a foam glass that can control the elution concentration of Sb is useful as a novel method for recycling a solar cell module glass and a method for recycling a solar cell module.

The invention claimed is:

1. A method for producing a foam glass, the method comprising:
   crushing a glass containing antimony to produce a glass powder;
   mixing the glass powder with at least one foaming agent selected from SiC, $CaCO_3$ and a seashell, and an inhibitor containing a combination of $Fe_2O_3$ with $CaSO_4$ or an inhibitor containing $Al_2(SO_4)_3$ to obtain a mixture; and
   heating the mixture to 700 to 1,100° C., followed by melting and foaming, and wherein
   a content of antimony in the glass containing antimony is 5 to 5,000 ppm.

2. The method according to claim 1, wherein 0.1 to 15 g of the foaming agent is added per 100 g of the glass powder.

3. The method according to claim 1, wherein 0.1 to 25 g of the inhibitor is added per 100 g of the glass powder.

4. The method according to claim 1, comprising heating the mixture to 700 to 1,100° C., followed by melting and foaming so that an inhibitor containing a combination of $Fe_2O_3$ with $CaSO_4$ or an inhibitor containing $Al_2(SO_4)_3$ exists in a pore of a glass foam.

5. The method according to claim 1, wherein an elution amount of antimony from the foam glass into water is less than 5 ppm.

6. The method according to claim 1, wherein at least two inhibitor selected from $Fe_2O_3$, $Al_2(SO_4)_3$ and $CaSO_4$ exists in a pore of the foam glass.

7. The method according to claim 1, wherein the glass containing antimony comprises a solar cell module glass.

8. The method according to claim 1, wherein the glass containing antimony comprises a waste solar cell module glass.

* * * * *